(12) United States Patent
Allcock et al.

(10) Patent No.: US 7,374,453 B1
(45) Date of Patent: May 20, 2008

(54) ENCLOSURE-TO-RAIL RETAINING SYSTEM AND METHOD

(75) Inventors: David John Allcock, Markham (CA); Hafiz Talukder, Toronto (CA)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/617,227

(22) Filed: Dec. 28, 2006

(51) Int. Cl.
*H01R 13/60* (2006.01)
(52) U.S. Cl. ....................... 439/532; 439/716
(58) Field of Classification Search ............... 439/532, 439/716
See application file for complete search history.

(56) References Cited

U.S. PATENT DOCUMENTS

| 5,135,415 | A | * | 8/1992 | Huber ........................ 439/716 |
| 5,192,227 | A | | 3/1993 | Bales |
| 5,904,592 | A | * | 5/1999 | Baran et al. ................ 439/532 |
| 6,172,875 | B1 | * | 1/2001 | Suzuki et al. ............... 361/729 |

* cited by examiner

*Primary Examiner*—Ross Gushi
(74) *Attorney, Agent, or Firm*—Cantor Colburn LLP

(57) ABSTRACT

Disclosed herein relates to an enclosure-to-rail retaining system. The system includes, a rail that is fastenable to a structure, and an enclosure that is receptive of the rail. The enclosure has a slot therein that intersects a channel therein and is slidably engagable by a clip such that a portion of the clip can extend into the channel to thereby narrow a portion of the channel to a dimension less than a width of the rail.

19 Claims, 3 Drawing Sheets

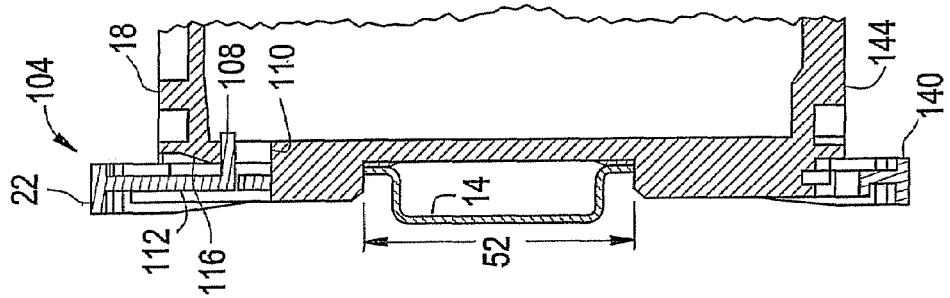
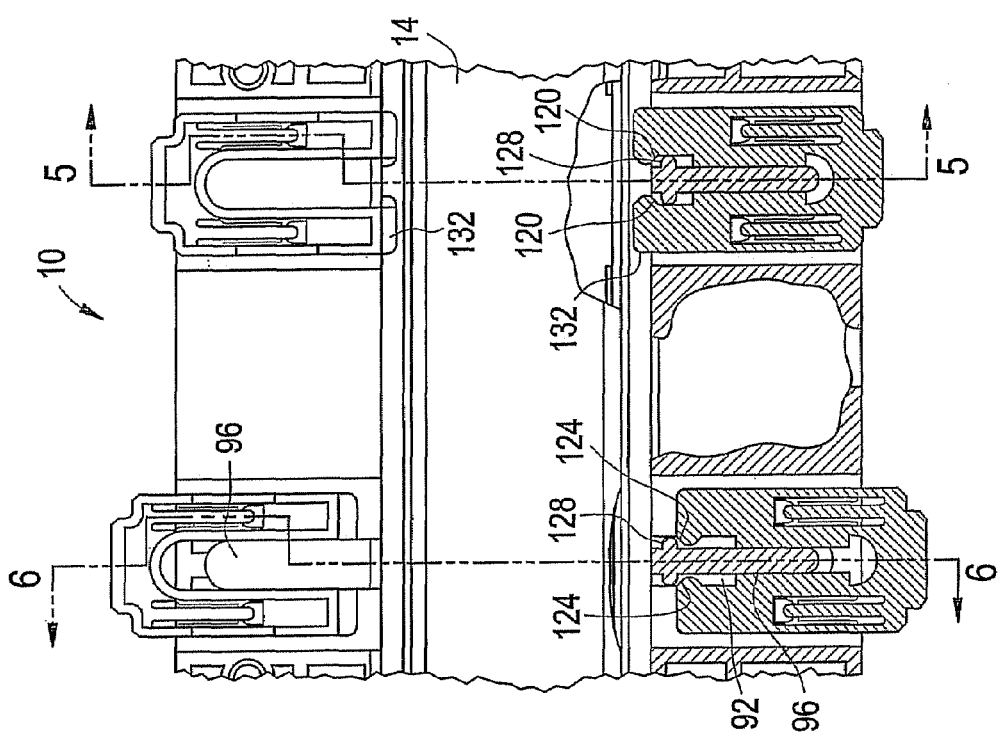
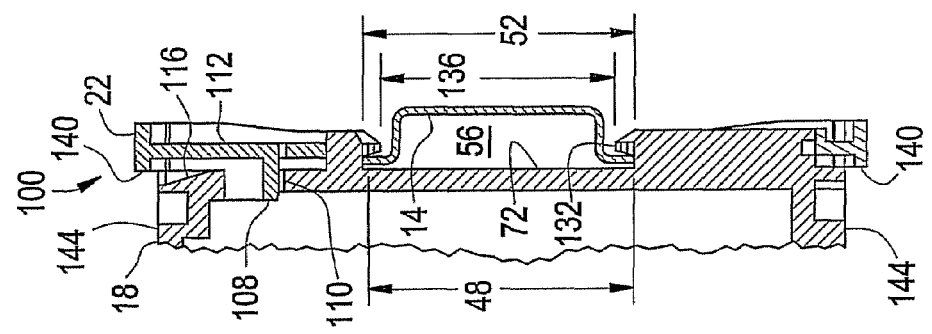

ENCLOSURE-TO-RAIL RETAINING SYSTEM AND METHOD

BACKGROUND OF THE INVENTION

A DIN rail is a standardized 35 mm wide metal rail with a top-hat shaped cross section. It is widely used, especially in Europe, for mounting circuit breakers and industrial control equipment inside equipment racks. In addition to the popular 35 mm top-hat rail several less widely used types of top-hat mounting rails have also been standardized. Top-hat rails are usually mounted in a horizontal orientation to a flat vertically oriented surface. In such an orientation the top-hat cross section provides an upwardly oriented edge and a downwardly oriented edge. The forgoing structure provides a strong stable mounting rail on which to mount enclosures that house a myriad of devices.

Attachment of enclosures to the rail is typically accomplished by sizing a horizontal channel in a surface of an enclosure that is slightly greater in width than the width of the rail. Typically a downwardly extending lip on an upper sidewall of the channel engages with the upwardly oriented edge of the rail. Thus, weight of the enclosure, and device housed therein, pull the downwardly extending lip into contact with the upwardly oriented edge of the rail and thereby hold the enclosure to a vertical surface to which the rail is attached.

Such a system, however, has the potential for the enclosure to become unintentionally disengaged from the rail if the enclosure is inadvertently bumped in a specific manner. For example, if the bump causes the downwardly extending lip on the channel to be momentarily lifted above the upwardly oriented rail edge the lip may not reengage with the edge upon resettling. If this happens the enclosure will no longer be retained on the rail and will fall with possibly damaging consequences.

To improve retention to the rail some rail mounting systems use a movable lip on one side of the channel and a stationary lip on the other side of the channel. Such a system may successfully prevent the inadvertent disengagement discussed above. Having a lip fixedly attached to either side of the channel, however, requires that the enclosure be tilted relative to the rail when installing the enclosure onto the rail. This tilting action allows the fixed lip to be positioned behind the edge of the rail before tilting the enclosure back to a square orientation with the rail, wherein the lip engages with the rail as described above. Some applications however have limited space available above and below the mounting location of the enclosure precluding the tilting necessary to engage the lip beyond the edge of the rail.

Accordingly there is a need in the art for an enclosure to rail mounting system that doesn't require clearance above or below a mounting location of the enclosure.

BRIEF DESCRIPTION OF THE INVENTION

Disclosed herein relates to an enclosure-to-rail retaining system. The system includes, a rail that is fastenable to a structure, and an enclosure that is receptive of the rail. The enclosure has a slot therein that intersects the channel and is slidably engagable by a clip such that a portion of the clip can extend into the channel to thereby narrow a portion of the channel to a dimension less than a width of the rail.

Further disclosed herein is an enclosure-to-rail retaining system. The system includes, a rail that is fastenable to a structure and an enclosure with a channel, the enclosure being void any fixed portion that reduces a portion of the channel to a width less than the width of the rail. The enclosure also having a plurality of slots that each intersect with the channel and at least two of the slots are located on opposite sides of the channel from one another. The system also includes a plurality of clips each of which is slidably engagable within one of the slots, a portion of which can extend into the channel to thereby narrow a width of the channel to a dimension less than the rail width.

Further disclosed herein is a method of attaching and detaching an enclosure to a rail. The attaching method includes, positioning the rail within a channel of the enclosure, lockably engaging the rail within the channel in response to narrowing the channel with a clip by repositioning the clip from a second position to a first position relative to the enclosure. The detaching method includes, disengaging the rail from the channel by widening the channel to a full channel width by repositioning the clip from the first position to the second position, and removing the rail from within the channel.

BRIEF DESCRIPTION OF THE DRAWINGS

The following descriptions should not be considered limiting in any way. With reference to the accompanying drawings, like elements are numbered alike:

FIG. 4 depicts a partial cross sectional view of the system of FIG. 1;

FIG. 5 depicts another partial cross sectional view of the system of FIG. 1 and FIG. 4 taken at arrows 5-5 in FIG. 4; and FIG. 6 depicts another partial cross sectional view of the system of FIG. 1 and FIG. 4 taken at arrows 6-6 in FIG. 4.

DETAILED DESCRIPTION OF THE INVENTION

A detailed description of several embodiments of the disclosed apparatus and method are presented herein by way of exemplification and not limitation with reference to the Figures.

Figure 1:
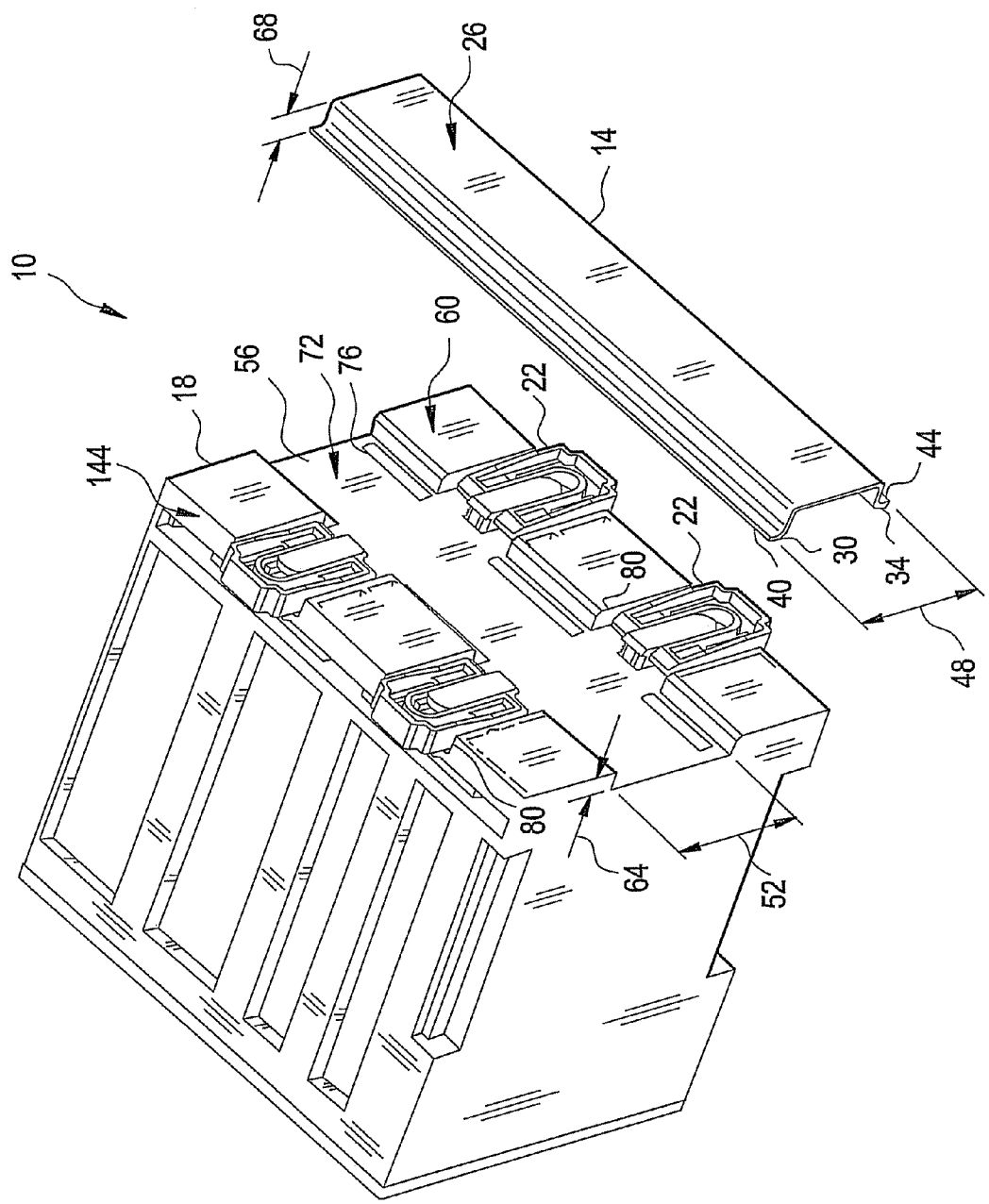
FIG. 1 depicts a perspective view of an enclosure-to-rail retaining system disclosed herein.

Referring to FIG. 1 an embodiment of the enclosure-to-rail retaining system 10 is illustrated. The enclosure-to-rail retaining system 10 includes a rail 14, an enclosure 18 and a plurality of clips 22. The rail 14 is mountable to a structure, such as a vertical wall or surface of a cabinet (not shown) for example, with screws, nails, clips, adhesive or the like. The rail 14 is a thin elongated member made of a strong rigid material such as metal, for example. The rail 14 can have a cross sectional shape that resembles a cross section of a top-hat and, as such, is commonly referred to as a top-hat rail. Top-hat rails are also referred to as DIN rails. DIN is a German acronym, which stands for, when translated to English, the German Institute for Standardization, which is Germany's ISO body. ISO is the International Organization for Standardization. While DIN rails must meet specific dimensional requirements, embodiments disclosed herein apply to mounting rails whether or not they comply with the DIN standards.

The rail 14 has an attachment surface 26 that abuts a surface of a structure to which it is structurally attached. The rail 14 includes two flanges, a first flange 30 and second flange 34 that are substantially parallel to the attachment surface 26. The flanges 30, 34 lie in a plane that is offset from a plane defined by the attachment surface 26. In an embodiment of FIG. 1 the rail 14 is mounted in a substantially horizontal orientation, however, embodiments are not limited to this orientation. The first flange 30 includes a first edge 40 and extends upwardly relative to the surface 26. The second flange 34 includes a second edge 44 and extends downwardly relative to the surface 26. A rail width 48, defined as the dimension from the first edge 40 to the second edge 44, can vary depending upon requirements of a particular application. Whatever the rail width 48 happens to be for a particular application, a mating channel width 52, of a channel 56, in a surface 60, of the enclosure 18, is sized to accommodate the rail width 48 therein.

The channel 56, in the enclosure 18, also has a channel depth 64 sized to accommodate a rail depth 68, of the rail 14. As such, the flanges 30, 34 and the edges 40, 44, substantially rest against a floor 72 of the channel 56 when the enclosure 18 is pressed fully against the rail 14. Optional pads 76 on the floor 72 of the channel 56 provide contact points for the flanges 30, 34 to contact against when the enclosure 18 is pressed fully against the rail 14. The channel 56 also has four slots 80; each of which intersect with the channel 56.

Figure 2:
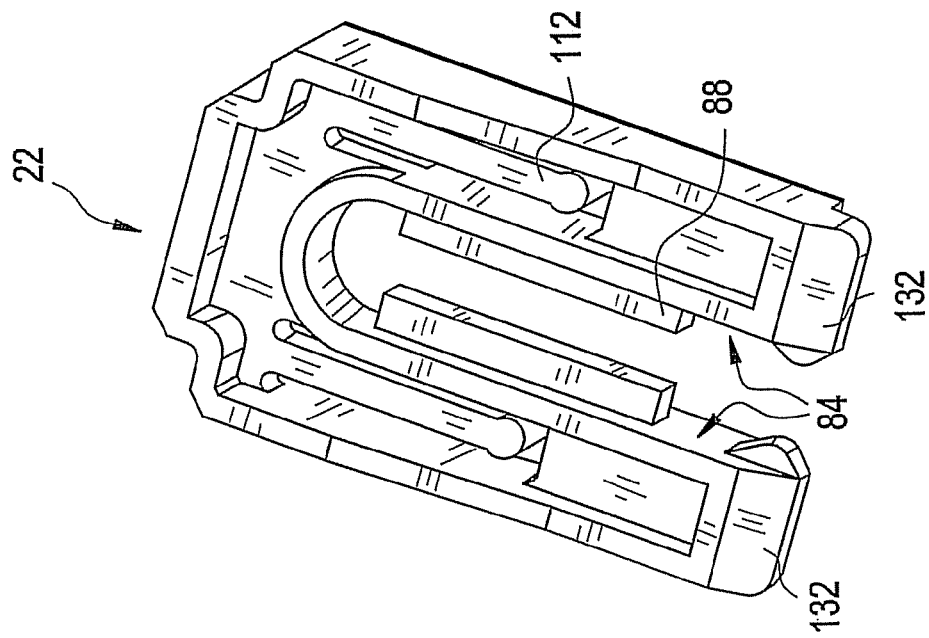
FIG. 2 depicts a perspective view of a clip used in the system of FIG. 1.
Figure 3:
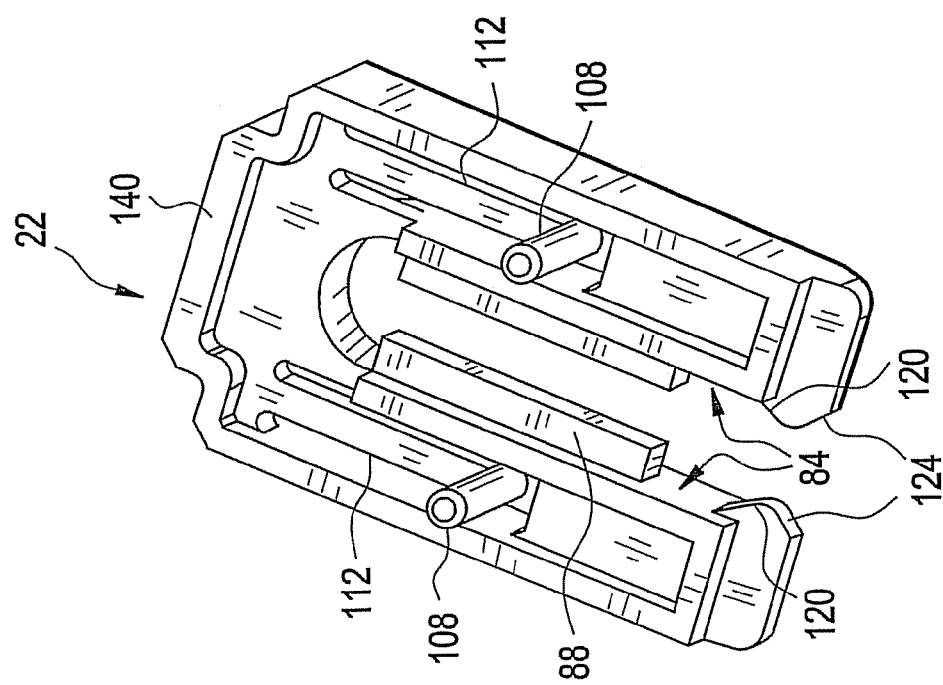
FIG. 3 depicts a perspective view of a side opposite the side of the clip shown in FIG. 2.

The slots 80 are oriented substantially perpendicular to a length of the channel 56. Each slot 80 is slidably engagable with one of the clips 22. Referring to FIGS. 2 and 3, the clips 22 have a generally square C shape. Along opposing inwardly facing surfaces 84, of the clips 22, are bars 88 that ride within a pair of slots 92 positioned on a T-bar 96 within the slots 80 of the enclosure 18. The slidable engagement of the bars 88 within the slots 92 of the T-bars 96 retain the clips 22 to the enclosure 18, the importance of which will be discussed in detail below.

Referring to FIGS. 4-6, once the clips 22 are assembled to the enclosure 18 the clips 22 are movable between a first position 100 and a second position 104. Movement is limited to the positions 100, 104 by a pair of posts 108 on each of the clips 22 that travel within windows 110 in the enclosure 18. The posts 108 are mounted to cantilevered members 112 that extend substantially parallel to a plane defined by the clips 22. The cantilevered members 112 flex to allow the posts 108 to ramp along inclined planes 116 of the enclosure 18 and into the windows 110 during the initial assembly of the clips 22 to the enclosure 18. After the initial assembly the posts 108 remain within the windows 110 effectively retaining the clips 22 to the enclosure 18.

The clips 22 are biased towards the positions 100 and 104 such that the biasing forces will move the clips 22 to one of the first position 100 and the second position 104 if left at any point in between the positions 100, 104. The clips 22 include two pairs of ramped surfaces 120 and 124. The first pair of ramped surfaces 120 are angled outwardly from the clips 22 towards an internal portion of the generally square C shape of the clips 22. The second pair of ramped surfaces 124 are angled outwardly from the clips 22 towards an external portion of the square C shape of the clips 22. The square C shape of the clips 22 are flexed in an opening direction in response to either pair of ramps 120, 124 riding against a pair of protrusions 128 that extend outwardly from the slots 92 in the T-bar 96. Thus, a resilient flexing force of the clips 22 causes the clips 22 to move toward the first position 100 in response to the first ramped surfaces 120 being in contact with the protrusions 128. Conversely, the resilient flexing force causes the clips 22 to move toward the second position 104 in response to the second ramped surfaces 124 being in contact with the protrusions 128. It should be noted that alternate embodiments could locate the ramped surfaces on the T-bar 96 and the protrusions 128 on the clips 22 to achieve the same biasing effect discussed herein. Assuring the clips 22 are in one of the first position 100 or the second position 104 is important to the operation of the enclosure-to-rail retaining system 10 as discussed below.

Movement of the clips 22 from the second position 104 to the first position 100 results in a portion of the clips 22, disclosed herein as end tabs 132, extending into a portion of the channel 56. This is best observed by comparing the clips 22 in the second position 104 in FIG. 6 to the clips 22 in the first position 100 in FIG. 5. In the second position 104 the end tabs 132 do not extend into the channel 56 thus leaving the channel 56 open to the full channel width 52. Conversely, in the first position 100 the end tabs 132 extend into the channel 56 thereby narrowing a portion of the channel 136 to a dimension that is less than the rail width 48. Since the end tabs 132 are not flush against the floor 72 of the channel 56 there is room for the flanges 30 and 34 of the rail 14 to fit within the channel 56 while the end tabs 132 are extended into the channel 56 thereby locking the rail 14 within the channel 56. With the rail 14 locked into the channel 56 the enclosure 18 is retained to the rail 14 and a structure to which the rail 14 is attached.

Further, having the channel 56 be openable to the full channel width 52, in response to the clips 22 being in the second position 104 has advantages. For example, the rail 14 can be moved all the way into the channel 56 until the flanges 30, 34 contact the floor 72 (or the optional pads 76 if present) while maintaining the rail 14 substantially parallel to the floor 72 at all times. This condition removes the need to tilt the enclosure to engage a fixed channel lip on the first edge 40 of the rail 14, for example. This allows the mounting of the enclosure 18 to the rail 14 in applications where there is insufficient clearance above the enclosure 18 to tilt the enclosure 18 prior to installation onto the rail 14. Similarly, during removal of the enclosure 18 from the rail 14 the enclosure 18 need not be tilted either.

Removal for the enclosure 18 from the rail 14 requires the clips 22 be repositioned from the first position 100 to the second position 104. Doing so requires no more than a quarter turn of a flat head screwdriver that has been properly placed relative to the enclosure-to-rail retaining system 10. A lip 140 on a portion of the clips 22 extends beyond the surface 60 of the enclosure 18, a dimension roughly equal to the thickness of a screwdriver blade when the clips 22 are in the first position 100. This allows the screwdriver blade to be inserted between the lip 140 and an end surface 144 of the enclosure 18. A quarter turn of the screwdriver will cause the clips 22 to move outwardly from the first position 100 towards the second position 104. Once the clips 22 are moved more than half way between the first position 100 and the second position 104, in the range of one-eighth to one-quarter of an inch, the biasing action discussed above will force the clips 22 fully into the second position 104. With the clips 22 securely in the second position 104 the enclosure 18 can be removed directly from the rail 14, without having to tilt the enclosure 18.

By including slots 80 with clips 22 on both sides of the channel 56 the rail 14 can be secured against inadvertent bumps that could dislodge the enclosure 18 from the rail 14.

Additionally, multiple clips 22 can be used on each side of the channel 56 for applications wherein rough handling or high vibrational loads, for example, are anticipated. Alternate embodiments of the invention, however, can include clips 22 on only one side of the channel 56. For example, only the topside of the channel 56 could have clips 22 in applications with a horizontal rail 14, and still meet the spirit and scope of the present invention.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. An enclosure-to-rail retaining system, comprising:
   a rail having a rail width and being fastenable to a structure;
   an enclosure having a surface with a channel having a channel width, the channel width being greater than the rail width, the enclosure being void any fixed portion that reduces the channel width to less than the rail width, the channel thereby being receptive of the rail, the enclosure also having at least one slot therein intersecting with the channel; and
   at least one clip having a substantially C shape slidably engagable within the at least one slot, a portion of the at least one clip being extendable into the channel to thereby narrow a portion of the channel to a dimension less than the rail width, the at least one clip having an opening in the C shape that engages ramped surfaces of the enclosure that ramp to a larger opening of the C shape as the at least one clip reaches a midpoint between the first position and the second position.

2. The enclosure-to-rail retaining system of claim 1, wherein the rail is a DIN rail or a top-hat rail.

3. The enclosure-to-rail retaining system of claim 1, wherein the at least one clip is made of a polymer resin.

4. The enclosure-to-rail retaining system of claim 1, wherein the enclosure is made of a polymer resin.

5. The enclosure-to-rail retaining system of claim 1, wherein the rail is made of metal.

6. The enclosure-to-rail retaining system of claim 1, wherein the portion of the channel is narrowed in response to the at least one clip being in a first position and the channel is maintained the full channel width in response to the at least one clip being in the second position.

7. The enclosure-to-rail retaining system of claim 6, wherein the at least one clip is resilient to the flexing thereby creating a bias toward either the first position or the second position in response to the opening of the C shape sliding along the ramped surfaces.

8. The enclosure-to-rail retaining system of claim 6, wherein the rail is lockably retained within the channel in response to the at least one clip being in the first position.

9. The enclosure-to-rail retaining system of claim 1, further comprising:
   at least one post on each of the at least one clip extending substantially perpendicular to a plane defining the at least one clip, the at least one post being flexibly resilient in a direction substantially perpendicular to the plane defining the at least one clip.

10. The enclosure-to-rail retaining system of claim 9, further comprising:
    a window of the enclosure receptive of the at least one post and configured to limit travel of the at least one clip to a first position and a second position.

11. The enclosure-to-rail retaining system of claim 10, further comprising:
    a cantilevered member of the at least one clip to which the at least one post is attached, the cantilevered member being flexibly resilient to facilitate positioning of the at least one post within the window during initial installation of the retaining clip to the enclosure.

12. The enclosure-to-rail retaining system of claim 1, further comprising:
    a lip of the at least one clip receptive of a blade shaped tool to facilitate movement of the at least one clip from a first position to a second position.

13. The enclosure-to-rail retaining system of claim 12, wherein the lip is positioned less than one-eighth inch beyond a surface of the enclosure in response to the retaining clip being in the first position and the lip is positioned more than one-eighth inch beyond the surface of the enclosure in response to the retaining clip being in the second position.

14. An enclosure-to-rail retaining system, comprising:
    a rail having a rail width and being fastenable to a structure;
    an enclosure having a surface with a channel having a channel width, the channel width being greater than the rail width, the enclosure being void any fixed portion that reduces the channel width to less than the rail width, the channel thereby being receptive of the rail, the enclosure also having a plurality of slots therein intersecting with the channel, at least two of the plurality of slots being located on opposite sides of the channel from one another;
    a plurality of clips slidably engagable within the plurality of slots, a portion of each of the plurality of clips being extendable into the channel to thereby narrow a portion of the channel width to a dimension less than the rail width; and
    at least one post on each of the plurality of clips extending substantially perpendicular to a plane defining each of the plurality of clips, the at least one post being flexibly resilient in a direction substantially perpendicular to the plane defining the at least one clip.

15. The enclosure-to-rail retaining system of claim 14, further comprising a window of the enclosure receptive of the at least one post and configured to limit travel of the at least one clip to a first position and a second position.

16. The enclosure-to-rail retaining system of claim 14, wherein there total number of the at least one clips is four.

17. The enclosure-to-rail retaining system of claim 16, wherein two of the four clips are on a first side of the channel and the other two of the four clips are on a second side of the channel.

18. A method of attaching and detaching an enclosure to a rail, comprising:
    positioning the rail within a channel of the enclosure;
    lockably engaging the rail within the channel in response to narrowing a portion of the channel with a portion of at least one clip by repositioning the at least one clip from a second position to a first position relative to the enclosure;
    flexing a C shape of the at least one clip over at least one ramped surface to a larger opening of the C shape at a midpoint between the first position and the second position thereby biasing the at least one clip to one of the first position and the second position;

disengaging the rail from the channel in response to widening the channel to a full channel width by repositioning the at least one clip from the first position to the second position; and removing the rail from within the channel.

19. The method of attaching and detaching an enclosure to a rail of claim 18, further comprising:

prying a lip of the plurality of retaining clips to reposition the plurality of retaining clips from the first position to the second position.

\* \* \* \* \*